United States Patent [19]

Kubota et al.

[11] Patent Number: 4,526,103

[45] Date of Patent: Jul. 2, 1985

[54] ALUMINUM COATED STEEL SUPPORT FOR PLANOGRAPHIC PLATE

[75] Inventors: Michio Kubota, Amagasaki; Takeshi Shoji, Tokyo, both of Japan

[73] Assignee: Nisshin Steel Co., Ltd., Tokyo, Japan

[21] Appl. No.: 364,897

[22] Filed: Apr. 2, 1982

[51] Int. Cl.² ............................................. B41N 1/08
[52] U.S. Cl. .................... 101/459; 101/458; 148/11.5 Q; 428/653
[58] Field of Search ............... 101/458, 459; 428/653; 148/11.5 Q

[56] References Cited

U.S. PATENT DOCUMENTS

| | | | |
|---|---|---|---|
| 1,982,563 | 11/1934 | Wimmer | 428/653 |
| 2,406,245 | 8/1946 | Oganowski | 428/653 |
| 2,708,304 | 5/1955 | Lundin | 428/653 |
| 2,818,360 | 12/1957 | Porter | 428/653 |
| 2,883,739 | 4/1959 | Russell | 428/653 |
| 2,937,435 | 5/1960 | Brenner | 428/653 |
| 3,180,716 | 4/1965 | Sprowl | 428/653 |
| 3,292,256 | 12/1966 | Morgan | 428/653 |
| 3,705,023 | 12/1972 | Fister | 428/653 |
| 3,717,513 | 2/1973 | Adenis | 428/653 |
| 3,958,994 | 5/1976 | Burnett | 428/653 |

FOREIGN PATENT DOCUMENTS

| | | | |
|---|---|---|---|
| 130396 | 10/1981 | Japan | 101/458 |
| 150592 | 11/1981 | Japan | 101/458 |
| 32357 | 2/1982 | Japan | 148/11.5 Q |

Primary Examiner—Clyde I. Coughenour
Attorney, Agent, or Firm—Fleit, Jacobson, Cohn & Price

[57] ABSTRACT

A steel support for a planographic plate comprises a steel plate and aluminized layers thereon, each consisting of an alloy layer in contact with said plate and an aluminum layer applied over said alloy layer. The alloy layer is 0.2 to 5 microns in a thickness, and the aluminum layer is more than 7 microns in a thickness.

The aluminized plate is then cold-rolled at a rolling reduction of 30 to 85% in total to remove spangle dents or pin holes therefrom.

3 Claims, 3 Drawing Figures

ALUMINUM COATED STEEL SUPPORT FOR PLANOGRAPHIC PLATE

BACKGROUND OF THE INVENTION

The present invention relates to a planographic plate support having improved strength, and is concerned with a process for manufacturing such a support as well.

As the support for an image-receiving layer (e.g., a photo-conducting, photosensitive or heat-sensitive layer) of a planographic plate, aluminium plates have mainly been used in the art. These aluminium plates should have a thickness of more than 0.3 mm to provide adequate strength. However, use of such plates for support poses several problems because of softness in that they are susceptible to deformation or may become uneven during plate making or printing, and often can not withstand repeated use, resulting in increased printing costs.

SUMMARY OF THE INVENTION

A main object of the present invention is therefore to provide solutions to the above-mentioned problems.

Referring generally to the support for an image-receiving layer, it will suffice if only the surface layer thereof, which is usually on the order of several microns, is composed of aluminium. That is to say, only the surface layer of several microns need be formed of a material bearing resemblance to aluminium in softness and chemical properties. Thus the remaining portion of the support is not required to possess such properties.

As a result of extensive studies on various supports reinforced with a metal core, it has now been found that the desired object is accomplished if an aluminized steel plate is used as the support.

According to the present invention, there is provided a steel support for a planographic plate having an image-receiving layer on its surface, which comprises a steel plate aluminized on both sides, the aluminized layer of said plate consisting of an alloy layer of 0.2 to 5 microns and an aluminium layer of more than 7 microns.

BRIEF DESCRIPTION OF THE DRAWINGS

This and other objects and features of the present invention will be apparent from a reading of the following detailed description with reference to the accompanying drawings, in which.

DETAILED DESCRIPTION OF THE INVENTION

Figure 1:
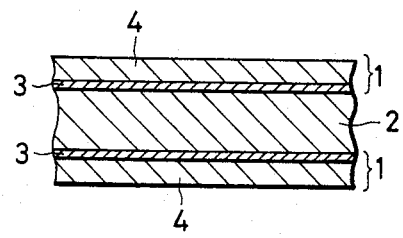
FIG. 1 is a cross sectional view showing an aluminized steel plate which forms the support according to the present invention.

As illustrated in FIG. 1, an aluminized steel plate comprises a steel plate 2 and aluminized layers 1 each consisting of an alloy layer 3 in contact with the plate 2 and an aluminium layer 4 applied over said alloy layer 3. The outermost aluminium layer 4 bears resemblance to aluminium itself in nature, and has a thickness sufficient to be subjected to sand blasting or anodized aluminium treatment. Thus, this aluminium layer is similar to conventional aluminum plates. When the inventive steel plate is used as the support, therefore, it exhibits a strength considerably greater than that of an aluminium plate due to the presence of a core or backing steel plate, and can stand up to repeated use unless abnormal handling is effected during plate making or printing. The abrasion of the aluminium layer is about 1-2 microns each time it is used, and can be accommodated if the aluminum thickness is increased.

The aluminium layer of the inventive support does not necessarily consist of 100% aluminium in terms of purity, and may be formed by plating in an ordinarily available molten aluminium bath. Experiments demonstrate that satisfactory results are obtained even if the aluminium layer contains 1 to 10 % of silicon, as is the case with aluminized steel plates for heat-resistant purposes, and/or contains other contaminative elements which are inevitably present in the process of plating.

However, the aluminium layer should have a thickness of more than 7 microns, because the steel support is usually treated by sand blasting or the like to improve the adherence of the image-receiving layer and the hydrophilic properties of the backing plate after plate making. If this thickness is too small, such treatments will become less effective.

The alloy layer in the aluminized layer is composed of an aluminium-iron alloy and/or an iron-silicon alloy, and is generally poor in workability. In the case of a steel support plate which is subjected to bending when it is mounted on a plate cylinder after plate making, it is preferred that the thickness of the alloy layer be reduced as much as possible. Usually, the inventive support comprising an aluminized steel plate is difficult to use without further processing. In other words, the support should be cold-rolled at a rolling reduction of 30 to 85% in total. Therefore, the alloy layer should have a thickness of at least 5 microns after being rolled within the above-mentioned range of rolling reductions so as to stand up to repeated bending. In aluminizing, the formation of an alloy layer is usually necessary; hence, it is extremely difficult to roll the alloy layer into a thickness of less than 0.2 microns even within the above-mentioned range of rolling reductions in relation to hardening of the steel plate. For these reasons, the alloy layer should preferably have a thickness of 0.2–5 microns.

The thickness of the inventive support can be made smaller than those of conventional aluminium plates is, since a steel plate superior in strength to a aluminium plates is used as a core or backing member. Thus, a support having a thickness of 0.25 mm or as small as 0.15 mm can be prepared. Accordingly, the support can easily be bent when mounting it on a plate cylinder for printing, resulting in lower printing costs.

The inventive support is fabricated by pretreating a cold-rolled steel plate and plating it in a molten aluminium followed by cold-rolling.

As is well known in the art, aluminized steel plates are prepared by two methods: one method involves the preparation of weather-resistant plates with a bath in which industrially pure aluminium is molten, and the other the preparation of heat-resistant plates which are further processed into articles, with the aid of a bath containing 1 to 10% of silicon. The support of the present invention is fabricated by the latter method, since the plate prepared by the former method has its alloy layer extending into its aluminized layer to a considerable extent. The aluminized layer cannot then stand up to repeated bending.

Figure 2:
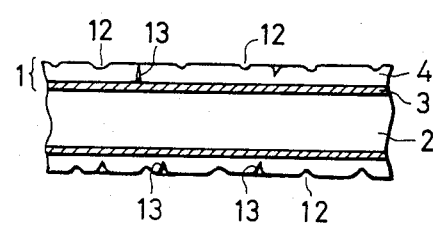
FIG. 2 is a schematic view showing the process for continuous aluminizing.

The process for manufacturing the inventive support will now be explained with reference to FIG. 2 which is illustrative of the latter method. FIG. 2 is a schematic view showing the sendzimir type apparatus for continuous aluminizing. A cold-rolled steel plate 2a to be aluminized is wound around a takeoff reel 5. Usually, an unannealed material is used as the steel plate. However, an annealed material is employed in using the apparatus having no in-line annealing furnace, such as the flux type apparatus for continuous aluminizing.

The steel plate 2a unrolled from takoff reel 5 is annealed and pretreated (reduced) in a reduction furnace 6, immersed in a molten aluminium bath 7 and, subsequently, pulled up vertically by means of a sink roll 8. The thus aluminized plate is wiped throttle by a gas stream from a gas throttle nozzle 9 to adjust the thickness of the aluminized layer. The aluminized layer coated on either side of the plate preferably has a thickness of 20-60 microns, more preferably 30-50 microns.

In the embodiment of the present invention, the bath 7 used contains 1-10% of silicon. When the Si content is below 1% the thickness of the alloy layer amounts to 60 to 70% of the whole thickness of the aluminized layer due to the fact that the effect of Si upon the inhibition of growth of the alloy layer is reduced or limited, so that the aluminized layer cannot attain the desired thickness unless the steel plate is aluminized to a thickness on the order of 60 microns. When the alloy layer is of such a large thickness, on the other hand, minute projections present in the vicinity of the surface of the alloy layer emerge therefrom upon being subjected to cold-rolling which is effected for closing of pin holes in a later stage, thus causing pin holes to also be formed in the image-receiving layer. It is true that the higher the Si content, the greater the effect of Si, but a Si content exceeding 10% permits the eutectic point of eutectic to be reached. As a result, various problems arise affecting quality and operation.

The aluminized plate is cooled and wound around a takeup reel 10 to produce a roll of aluminized steel plate 11.

Figure 3:
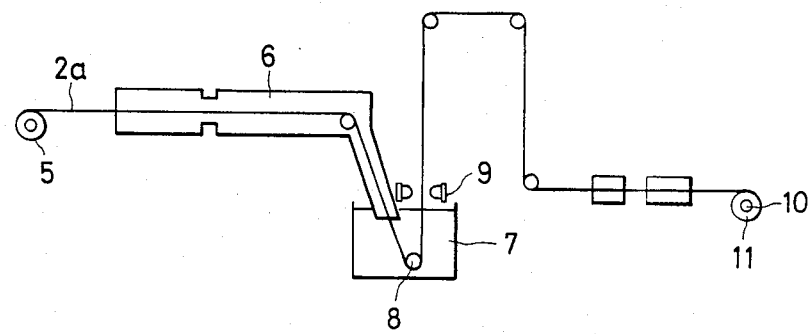
FIG. 3 is a cross sectional view illustrative of an aluminized steel plate having pin holes therein and spangle dents on its surface.

However, the steel plate 11 so obtained cannot be used as such for a steel support for a planographic plate since, as illustrated in FIG. 3, the plate has spangle dents 12 in its surface or pin holes 13 in its aluminized layer. That is to say, when an image-receiving layer is applied over said steel plate, the spangle dents or pin holes in the plate are reflected in said layer so that the resultant outer surface of the support becomes rugged.

According to the present invention, this problem can be solved by cold-rolling the aluminized plate at the rolling reduction of 30 to 85% in total to close the pin holes and flatten the spangle dents.

In general, the number of pin holes formed in the aluminized layer is relatively small owing to a so-called bridge effect in the case where that layer is 60 microns or more in thickness. The number of pin holes increases as the thickness of the aluminized layer becomes smaller, however, closing of the pin holes is effected by plastic deformation of the aluminized layer upon rolling, but is not completely accomplished at a rolling reduction of 20 to 25%. Therefore, a rolling reduction of at least 30% is necessary.

A total rolling reduction exceeding 85%, however, results in over-hardening, resulting in difficulties in bending the steel support when mounting it on a plate cylinder.

When an aluminized steel plate is cold-rolled, the steel plate and the aluminized layer are generally reduced in proportion to their original thickness. In the present invention, however, rolling is performed in such a manner that the aluminized layer on either side of the steel plate attains a thickness of more than 7 microns.

In the present invention, a total rolling reduction of 50-70% 70% is preferred. By rolling the steel plate at such a rolling reduction, the aluminized layer has its surface smoothed with resulting closing of the pin holes, while the steel plate itself is hardened to a suitable degree, whereby the support having improved strength is obtained.

The present invention will be further explained with reference to the following non-restrictive example.

EXAMPLE

A cold-rolled steel plate 0.5 mm in thickness and 914 mm in width was prepared and plated in a molten aluminium bath having a Si content of 8% to a thickness of 43 microns on each side. The aluminized plate was cold-rolled at a rolling reduction of 60% to form support sample No. 1 having a thickness of 0.2 mm.

Further, a cold-rolled steel plate 0.3 mm in thickness and 914 mm in width was prepared and plated in a molten aluminum bath having a Si content of 9% to a thickness of 31 microns on each side. The aluminized plate was cold-rolled at a rolling reduction of 50% to form support sample No. 2 having a thickness of 0.15 mm.

The maximum surface roughness Hmax of these samples was measured according to JIS B 0651. The results are given in Table 1.

TABLE 1

|  | Sample No. | |
|---|---|---|
|  | No. 1 | No. 2 |
| Before Rolling | 11μ | 8μ |
| After Rolling | 4μ | 3μ |

Table 2 shows the thickness of the aluminized layer and the changes of thickness in each sample.

TABLE 2

| Before and After Rolling | Sample No. | | | |
|---|---|---|---|---|
|  | No. 1 | | No. 2 | |
|  | Before | After | Before | After |
| Alloy Layer (μ) | 7 | 3 | 4 | 2 |
| Aluminium Layer (μ) | 36 | 14 | 27 | 13 |
| Total Thickness (μ) | 43 | 17 | 31 | 15 |

The presence of pin holes in the aluminium layer of each sample was then determined according to the Ferroxy 1 testing method as provided in JIS H 8672-1969. The results are set forth in Table 3. Measurement was carried out with five test pieces of a size of 100×100 mm taken from each sample.

TABLE 3

|  | Sample No. | |
|---|---|---|
|  | No. 1 | No. 2 |
| Before Rolling | One or two pin holes 0.2 to 0.5 mm in diameter | Four to six pin holes 0.2 to 0.5 mm in diameter |

TABLE 3-continued

| | Sample No. | |
|---|---|---|
| | No. 1 | No. 2 |
| After Rolling | No pin holes | No pin holes |

Each sample was sand-blasted in the conventional manner, and coated with a photo-setting resin to form an image-receiving layer, thereby providing a planographic plate. This plate was finished and tested with a planographic printer, and was found to show no sign of any spangle dents or pin holes and printing irregularities.

As will be evident from the foregoing results, the alloy layer can be limited to a thickness of up to 7 microns by plating a cold-rolled plate in a molten aluminium bath containing 8-9% of silicon, and can also be restricted to a thickness of up to 5 microns by cold-rolling the aluminized plate at a rolling reduction of 50-70%.

If the aluminized layer attains a thickness of 27-36 microns after plating, then it can attain a thickness of 13-17 microns after cold-rolling, without leaving the alloy layer exposed. Such a thickness can stand up to repeated use.

Cold-rolling provides a flattened surface free from any pin holes, on which an image-receiving layer can be coated satisfactorily.

As discussed above, the inventive support is neither deformed nor flawed as is the case with conventional aluminium plates, and can stand up to repeated use, since the outermost layer is formed of an aluminium layer capable of being subjected to sand blasting or plate making and the steel plate serving as a core or backing member makes a large contribution to strength.

The steel support prepared in accordance with the present invention is easy to bend, and has a smooth, pin-hole free surface which is best suited for supporting an image-receiving layer. There is also no fear that the aluminized layer may separate from the support due to repeated bending.

What is claimed is:

1. A planographic plate having an image-receiving layer on its surface, which comprises: a steel plate having a thickness of from about 0.15 mm to about 0.25 mm and hot-dip aluminized on each side by passing the steel plate through a bath consisting essentially of molten aluminum and from 1% to 10% silicon to provide an aluminized plate, and made by cold rolling said aluminized plate at a rolling reduction of 30% to 85% in total, the aluminized layer of said plate comprising an inner alloy layer of from about 0.2 to about 5 microns thickness and an outer aluminum layer of more than 7 microns thickness after cold rolling.

2. The planographic plate of claim 1, wherein said alloy layer comprises an aluminum-iron alloy.

3. The planographic plate of claim 1, wherein said alloy layer comprises an iron-silicon alloy.

* * * * *